Patented Mar. 31, 1936

2,035,707

UNITED STATES PATENT OFFICE 2,035,707

ELECTRIC HEATING DEVICE

George King, Oldbury, England, assignor of one-half to Albright & Wilson Limited, Oldbury, near Birmingham, England No Drawing. Application February 20, 1932, Serial No. 594,401. In Great Britain March 6, 1931

4 Claims. (Cl. 201—64)

A combination of an electrical conductor with a moulded composition of low electrical conductivity and of refractory nature constitutes a well-known heating device useful, for instance, as an electrically heated hot plate or as an electric radiator.

Such heating devices are generally made from refractory material, such as fireclay, mixed or not mixed with silica, moulded with the aid of a cement, usually sodium silicate, and fired.

Until now no cement for this purpose has been known which is wholly free from soluble salts, so that the heating devices have had as their chief defect their lack of stability due to natural or accidental absorption of water or its vapour. It has been difficult to make a composition, with the aid of a cementitious binder which will harden in the cold and is otherwise satisfactory, and which is free from matter capable of electrolysis in the presence of water. Such electrolysis tends to disintegrate the device.

This invention provides a combination of the kind in question wherein the refractory composition is substantially free from matter capable of electrolysis in presence of water.

The invention consists in an electrical conductor embedded or enclosed in, or supported by, a refractory body consisting of silica or other refractory material bound by means of silica and substantially free from substances capable of electrolysis in the presence of water. There is used in the manufacture a liquid binder of silica derived from a silicon ester. The use of silicon esters as binding agents is known (see, for instance, U. S. Patent No. 1,809,755, of June 9, 1931), which discloses mixing silicon esters and aqueous alcohol solutions. The mixture which at first separates into two layers, is stirred until a uniform solution is obtained. To the solution so obtained a further amount of esters may be added. The water present in the solution reacts with the esters to form silica and an alcohol or a mixture of alcohols. In many cases it is advantageous that the solution contain undecomposed esters, that is, the amount of water used should be less than that required to decompose the ester; they are characterized by the fact that the only permanent constituent which they introduce into the mass is silica.

For example, suitably powdered silica or sillimanite washed free from salts and mixed with a cement of silica derived from silicon ethyl ester yields a paste which may be moulded around the electrical conductor so as to form a plate in which the heating element is embedded. Or the paste may be moulded into the form of a core to which the electric conductor is fitted externally and then covered, if desired, by a thin layer of the paste.

The whole mass is then allowed to dry in the air for several hours, whereafter it is advantageously heated by passing an electric current through the conductor for a short time.

By a modification of the process the setting of the refractory body may be hastened a good deal by removing the alcohol from the paste by igniting it and allowing it to burn away.

The following examples illustrate the invention:—

Example 1.—2 kilos of powdered sillimanite, suitably graded, are mixed with 270 cc. of the solution of silica which is obtainable as described in Example 1 of Patent No. 1,809,755. The mixture, which has the form of a wet powder, is charged into a mould and the heating element is placed on the layer thus formed. The element is then covered with a further quantity of the mixture, and the whole is allowed to set with or without application of pressure. When the alcohol comprised in the solution of silica has substantially evaporated, the mass is warmed by passing an electric current through the heating element for 3 minutes at about half the maximum load. The plate thus produced is allowed to set and harden.

Example 2.—200 grams of powdered sillimanite, suitably graded, are mixed with 100 cc. of the solution of silica. The heating element is dipped into the paste so obtained, whereafter the alcohol is removed from the paste by ignition, and the sillimanite insulator left as an adherent coating around the element. This operation is repeated as often as may be necessary to build up an insulating layer of desired thickness around the element.

Example 3.—An iron casting suitably shaped is lined with an insulating layer of desired thickness by the method described in Example 2, and the element insulated according to the directions given in Example 2 is placed in the casing so lined and cemented in position by covering with a quantity of the mixture described in Example 1, and allowing the whole to set with or without pressure.

Example 4.—A core made of the mixture prescribed in Example 1 is wound with suitable wire while the mass is still plastic or after it has hardened.

Example 5.—The moulded composition is made in two parts which, when fitted together, form a compartment in which the heating element may be arranged; if desired, the construction may be such that the element can be withdrawn and renewed.

With reference to the grading of the sillimanite for the above examples, it may be stated that good results are obtained with sillimanite which has passed through a sieve having 60 meshes per square inch.

Having thus described the nature of the said invention and the best means I know of carrying the same into practical effect, I claim:—

1. An electrical heating device comprising an electrical conductor in combination with a body of finely divided refractory material, said conductor and said refractory material being bound together solely by a solid solution of unfused silica, and said device being substantially free from substances capable of electrolysis in the presence of water.

2. An electrical heating device comprising an electrical conductor embedded in a body of finely divided refractory material, said conductor and said refractory material being bound together solely by a solid solution of unfused silica, and said device being substantially free from substances capable of electrolysis in the presence of water.

3. An electrical heating device comprising an electrical conductor enclosed in a body of finely divided refractory material, said conductor and said refractory material being bound together solely by a solid solution of unfused silica, and said device being substantially free from substances capable of electrolysis in the presence of water.

4. A process of making an electrical heating device which comprises embedding an electrical conductor in a paste, made by mixing a finely divided refractory material with a solution of silica made from a silicon ester, and allowing the mass to harden in the form of an unfused solid solution of free silica from substances capable of electrolysis in the presence of water.

GEORGE KING.

CERTIFICATE OF CORRECTION.

Patent No. 2,035,707.  March 31, 1936.

GEORGE KING.

It is hereby certified that error appears in the printed specification of the above numbered patent requiring correction as follows: Page 2, second column, line 20, claim 4, strike out the word "free" and insert the same after "silica", same line and claim; and that the said Letters Patent should be read with this correction therein that the same may conform to the record of the case in the Patent Office.

Signed and sealed this 9th day of June, A. D. 1936.

Leslie Frazer (Seal)  Acting Commissioner of Patents.